United States Patent
Tso et al.

(10) Patent No.: US 11,679,830 B2
(45) Date of Patent: Jun. 20, 2023

(54) BICYCLE SEAT POST STRUCTURE

(71) Applicant: LIMOTEC METAL INDUSTRY LIMITED, Taichung (TW)

(72) Inventors: Tzu-Chien Tso, Taichung (TW); Yao-Chin Yang, Taichung (TW); Chih-Cheng Cheng, Taichung (TW); Huan-Wei Liu, Taichung (TW)

(73) Assignee: LIMOTEC METAL INDUSTRY LIMITED, Taichung (TW)

( * ) Notice: Subject to any disclaimer, the term of this patent is extended or adjusted under 35 U.S.C. 154(b) by 113 days.

(21) Appl. No.: 17/451,644

(22) Filed: Oct. 20, 2021

(65) Prior Publication Data

US 2022/0126939 A1 Apr. 28, 2022

(30) Foreign Application Priority Data

Oct. 22, 2020 (TW) ................................ 109213944

(51) Int. Cl.
*B62J 1/08* (2006.01)
(52) U.S. Cl.
CPC ............ *B62J 1/08* (2013.01); *B62J 2001/085* (2013.01)
(58) Field of Classification Search
CPC .............................. B62J 1/08; B62J 2001/085
See application file for complete search history.

(56) References Cited

U.S. PATENT DOCUMENTS

| | | | | |
|---|---|---|---|---|
| 5,500,981 A * | 3/1996 | Ho | ...................... | A45C 13/262 |
| | | | | 280/655 |
| 8,926,216 B2 * | 1/2015 | McAndrews | ............. | B62J 1/08 |
| | | | | 403/109.7 |
| 9,616,954 B2 * | 4/2017 | McPherson | ................ | B62J 1/08 |
| 9,688,331 B1 * | 6/2017 | Shirai | ......................... | B62J 1/08 |
| 9,963,181 B2 * | 5/2018 | Madau | .................... | F16F 9/512 |
| 10,246,155 B2 * | 4/2019 | McAndrews | .......... | B62K 19/36 |
| 10,252,774 B1 * | 4/2019 | Kawakami | ........... | B62M 25/045 |
| 10,689,049 B2 * | 6/2020 | Chiesa | .................... | B62K 19/36 |
| 10,807,667 B2 * | 10/2020 | Shipman | .................. | B62J 43/23 |
| 2002/0185581 A1 * | 12/2002 | Trask | ...................... | F16B 7/105 |
| | | | | 248/407 |
| 2009/0324327 A1 * | 12/2009 | McAndrews | .......... | B62K 19/36 |
| | | | | 297/207 |
| 2012/0104809 A1 * | 5/2012 | Hsu | ........................... | B62J 1/08 |
| | | | | 297/215.13 |
| 2018/0273123 A1 * | 9/2018 | Eberlberger | ........... | B62K 19/36 |
| 2022/0041237 A1 * | 2/2022 | Tso | ........................... | B62J 1/08 |

\* cited by examiner

*Primary Examiner* — Philip F Gabler
(74) *Attorney, Agent, or Firm* — CKC & Partners Co., LLC

(57) ABSTRACT

A bicycle seat post structure includes an upper tube, a lower tube, a height adjusting mechanism and at least one sliding member. The upper tube includes at least one stopping member. The lower tube has a first edge. The sliding member is movably disposed in the lower tube. The stopping member does not abut against the sliding member as the stopping member is in a first position. When the height adjusting mechanism is operated to allow the upper tube to move along an axial direction, the stopping member is switched to a second position and is restricted by the sliding member. The sliding member is operated to move along the axial direction so as to be positioned from one of a plurality of positions to another one of the plurality of positions, thereby changing a distance between the stopping member in the second position and the first edge.

10 Claims, 5 Drawing Sheets

BICYCLE SEAT POST STRUCTURE

RELATED APPLICATIONS

This application claims priority to Taiwan Application Serial Number 109213944, filed Oct. 22, 2020, which is herein incorporated by reference.

BACKGROUND

Technical Field

The present disclosure relates to a bicycle seat post structure. More particularly, the present disclosure relates to a bicycle seat post structure with an adjustable height.

Description of Related Art

A bicycle includes a seat post installed on the seat tube of the frame, and the seat post has a height adjusting function for a rider to adjust the height of the saddle. Generally, the seat post can include an upper tube and a lower tube. The upper tube is inserted in the lower tube, and the upper tube is connected to the saddle and can be moved relative to the lower tube.

A conventional seat post can further include a C-shaped clip for securing the upper tube and the lower tube; however, such securing method is easily loosened, and the reliability thereof is not enough. Hence, a height adjusting device is developed to include a tube body for receiving a gas, oil or both of the gas and the oil. A piston and a valve are disposed therein and the height of the piston relative to the tube body is changed so as to adjust the height of the seat post. If the user would like to lower the height of the seat post, the valve is required to be opened and the upper tube is required to be pressed to allow the upper tube to be lowered relative to the lower tube; on contrast, if the user would like to increase the height of the seat post, the valve is required to be opened and the upper tube is required to be restricted by the hand of the user or the body of the user to allow the upper tube to be lifted to a predetermined position relative to the lower tube. Moreover, if the user does not restrict the upper tube, the upper tube will automatically be lifted to the highest point, which brings inconvenience in use.

Therefore, how to solve the abovementioned problems becomes a pursued target for practitioners.

SUMMARY

According to one aspect of the present disclosure, a bicycle seat post structure is provided. The bicycle seat post structure includes an upper tube, a lower tube, a height adjusting mechanism and at least one sliding member. The upper tube includes an outer wall and at least one stopping member protruding from the outer wall. The lower tube is configured for the upper tube to be movably disposed therein and has a first edge. The height adjusting mechanism is disposed in the upper tube and the lower tube. The at least one sliding member is movably disposed in the lower tube. The at least one stopping member does not abut against the at least one sliding member as the at least one stopping member is in a first position. When the height adjusting mechanism is operated to allow the upper tube to move along an axial direction, the at least one stopping member is switched to a second position and is restricted by the at least one sliding member. The at least one sliding member is operated to move along the axial direction so as to be positioned from one of a plurality of positions to another one of the plurality of positions, thereby changing a distance between the at least one stopping member in the second position and the first edge.

According to another aspect of the present disclosure, a bicycle seat post structure is provided. The bicycle seat post structure includes an upper tube, a lower tube and at least one sliding member. The upper tube includes an outer wall and at least one stopping member protruding from the outer wall. The lower tube is configured for the upper tube to be movably disposed therein and has a first edge. The at least one sliding member is movably disposed in the lower tube. The at least one stopping member does not abut against the at least one sliding member as the at least one stopping member is in a first position. When the upper tube moves along an axial direction, the at least one stopping member is switched to a second position and is restricted by the at least one sliding member. The at least one sliding member is operated to move along the axial direction so as to be positioned from one of a plurality of positions to another one of the plurality of positions, thereby changing a distance between the at least one stopping member in the second position and the first edge.

BRIEF DESCRIPTION OF THE DRAWINGS

The disclosure can be more fully understood by reading the following detailed description of the embodiments, with reference made to the accompanying drawings as follows.

DETAILED DESCRIPTION

It will be understood that when an element (or mechanism or module) is referred to as being "disposed on", "connected to" or "coupled to" another element, it can be directly disposed on, connected or coupled to another element, or it can be indirectly disposed on, connected or coupled to another element, that is, intervening elements may be present. In contrast, when an element is referred to as being "directly disposed on", "directly connected to" or "directly coupled to" another element, there are no intervening elements present.

In addition, the terms first, second, third, etc. are used herein to describe various elements or components, these elements or components should not be limited by these terms. Consequently, a first element or component discussed below could be termed a second element or component.

Figure 1:
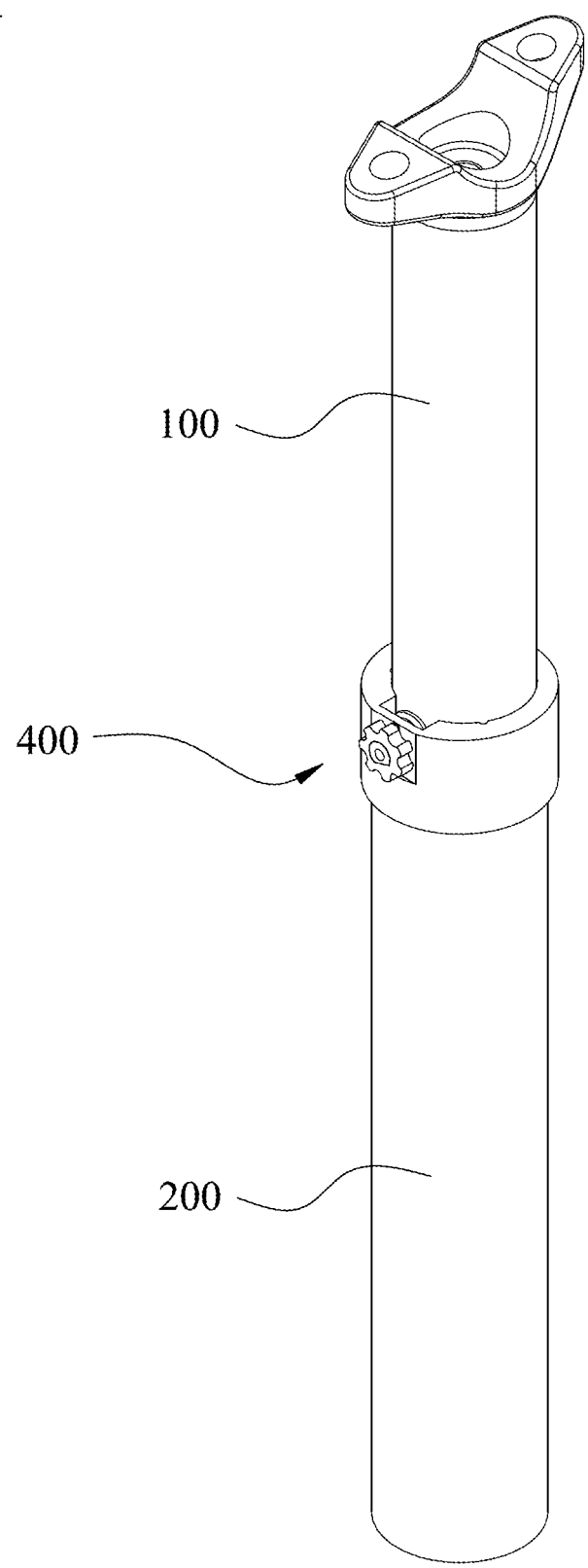
FIG. 1 shows a three-dimensional schematic view of a bicycle seat post structure according to one embodiment of the present disclosure.
Figure 2:
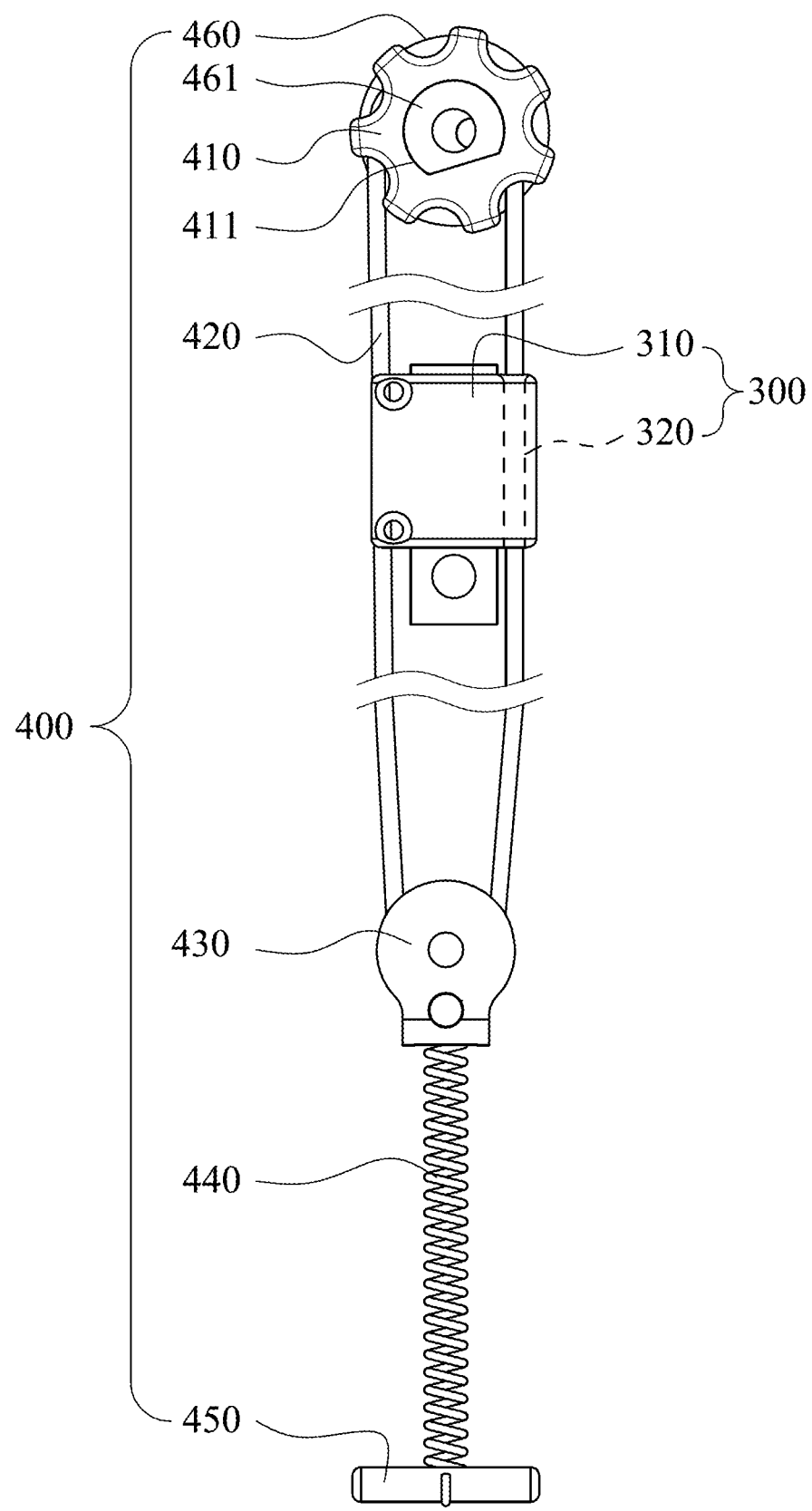
FIG. 2 shows a front view of a driving mechanism and at least one sliding member of the bicycle seat post structure according to the embodiment of FIG. 1.
Figure 3:
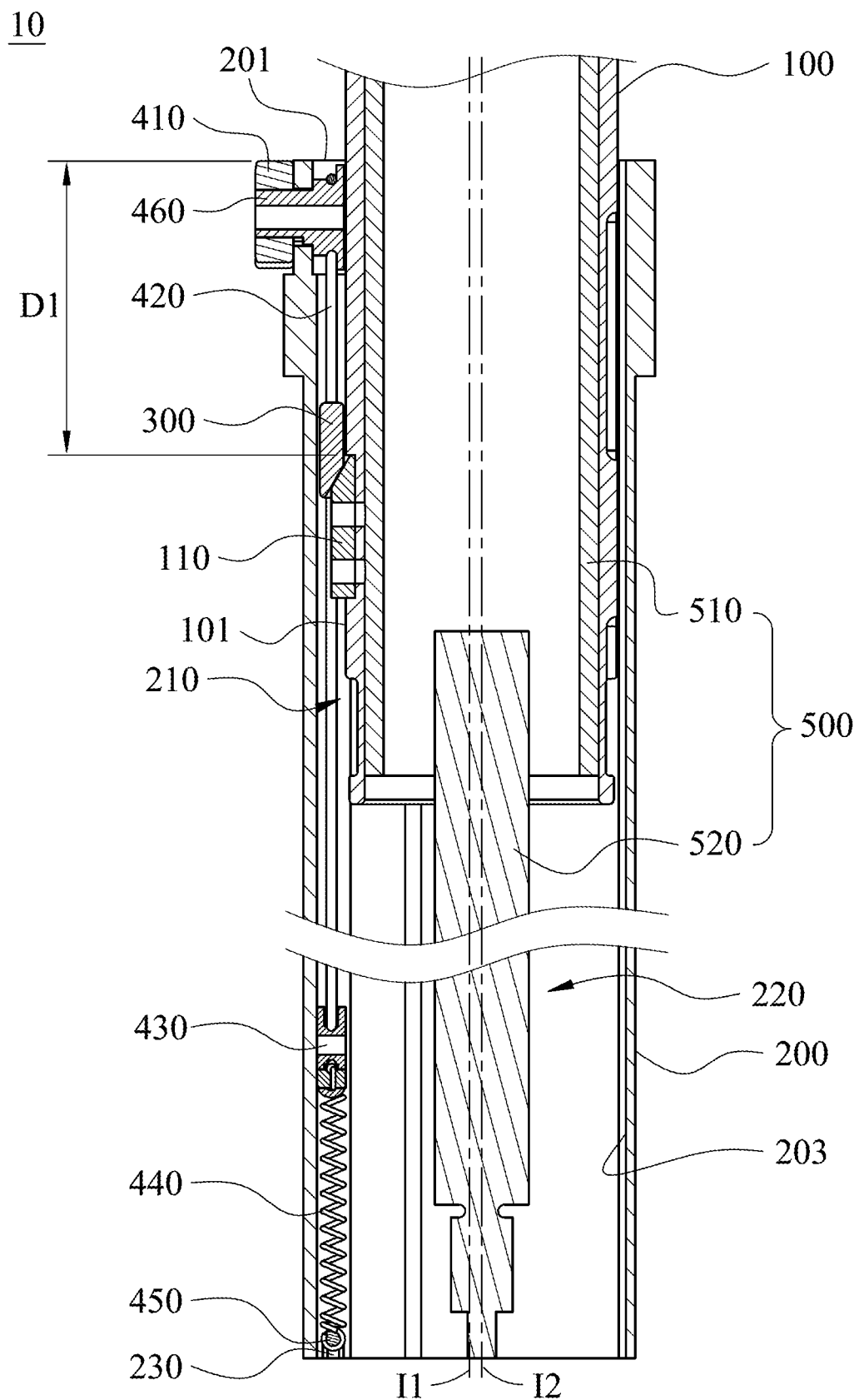
FIG. 3 shows one cross-sectional view of the bicycle seat post structure according to the embodiment of FIG. 1.

FIG. 1 shows a three-dimensional schematic view of a bicycle seat post structure 10 according to one embodiment of the present disclosure. FIG. 2 shows a front view of a driving mechanism 400 and at least one sliding member 300 of the bicycle seat post structure 10 according to the embodiment of FIG. 1. FIG. 3 shows one cross-sectional view of the bicycle seat post structure 10 according to the embodiment of FIG. 1. The bicycle seat post structure 10 includes an upper tube 100, a lower tube 200 and at least one sliding member 300.

The upper tube 100 includes an outer wall 101 and at least one stopping member 110 protruding from the outer wall 101. The lower tube 200 is configured for the upper tube 100 to be movably disposed therein and has a first edge 201. The at least one sliding member 300 is movably disposed in the lower tube 200. The at least one stopping member 110 does not abut against the at least one sliding member 300 as the at least one sliding member 300 is in a first position. When the upper tube 100 moves along an axial direction, which is not shown and is identical to the direction parallel to the central axis 11 in FIG. 3, the at least one stopping member 110 is switched to a second position and is restricted by the at least one sliding member 300. The at least one sliding member 300 is operated to move along the axial direction so as to be positioned from one of a plurality of positions to another one of the plurality of positions, thereby changing a distance D1 between the at least one stopping member 110 in the second position and the first edge 201.

Therefore, since the bicycle seat post structure 10 includes the sliding member 300 whose position is changeable, the stopping member 110 in the second position can be changed corresponding to the position of the sliding member 300, and the stroke of the upper tube 100 can be adjusted. The details of the bicycle seat post structure 10 will be described hereinafter.

As shown in FIG. 3, the bicycle seat post structure 10 can further include a height adjusting mechanism 500. The height adjusting mechanism 500 is disposed in the upper tube 100 and the lower tube 200, and the height adjusting mechanism 500 is operated to allow the upper tube 100 to move along the axial direction. To be more specific, the lower tube 200 can include an inserted space 220 configured for the upper tube 100 to be dispose therein. The upper tube 100 also has a hollow tube structure; hence, as the upper tube 100 is inserted into the lower tube 200, the inserted space 220 is commutated with the internal region of the upper tube 100 to allow the height adjusting mechanism 500 to be received therein.

The height adjusting mechanism 500 can further include a tube body 510, an actuating bar 520, a valve (not shown) and a piston (not shown). The actuating bar 520 can insert into the tube body 510, and when the actuating bar 520 is pushed, the valve is opened to allow the movement of the piston, thereby leading the relative movement between the upper tube 100 and the lower tube 200. The abovementioned technique is conventional and is not a key factor of the present disclosure; therefore, the details will not be mentioned and will not be shown in the drawings.

As shown in FIGS. 2 and 3, the bicycle seat post structure 10 can further include at least one driving mechanism 400 configured to move the at least one sliding member 300. The at least one driving mechanism 400 includes a spool 460 pivotally disposed at the lower tube 200, a wire 420 supported by the spool 460 and connected to the at least one sliding member 300, and a knob 410 coupling to the spool 460. A rotation of the knob 410 causes a movement of the wire 420, thereby leading the at least one sliding member 300 to move along the axial direction. Precisely, a number of the at least one sliding member 300 is one, and a number of the at least one driving mechanism 400 is one. The spool 460 can include a central shaft 461 configured to insert into a radial hole (not labeled) of the lower tube 200, and the knob 410 can expose from the lower tube 200 and include an engaging hole 411 engaged with the central shaft 461; hence, the user is required to rotated the knob 410 to cause the wire 420 to move the sliding member 300, and thus the position of the sliding member 300 can be changed.

The at least one driving mechanism 400 can include a pulley 430 and a spring 440. The pulley 430 is spaced apart from the spool 460. One of two ends of the spring 440 is restricted by the lower tube 200 and the other one of the two ends of the spring 440 is connected to the pulley 430. The wire 420 supported by the spool 460 and the pulley 430 forms a ring shape. In detail, as shown in FIG. 2, the sliding member 300 can include a main body 310 and a wire hole 320. After passing though the wire hole 320, one end of the wire 420 can cross over the spool 460 to be secured at an upper end of the main body 310, and the other end of the wire 420 can cross over the pulley 430 to be secured at a lower end of the main body 310, thereby forming a ring shape. The driving mechanism 400 can further include a limiting pin 450, the limiting pin 450 can be restricted within a restricting slot 230 of the lower tube 200, but the present disclosure is not limited thereto. The spring 440 can absorb the impact caused by the collision between the sliding member 300 and the stopping member 110.

As shown in FIG. 3, the lower tube 200 can include an inner wall 203 and at least one axial groove 210. In the embodiment of FIGS. 1-3, a number of the at least one axial groove 210 is one, and the axial groove 210 is disposed on the inner wall 203 to allow the sliding member 300 to be received therein. The sliding member 300 can be moved along the axial groove 210, thereby increasing the stability of the movement of the sliding member 300. Moreover, the spool 460, the wire 420, the pulley 430 and the spring 440 can be received in the axial groove 210, and the space utilization is improved.

Furthermore, the inserted space 220 can be communicated with the axial groove 210, and a central axis 12 of the inserted space 220 and a central axis 11 of the lower tube 200 are not coaxial. In other words, the inserted space 220 is eccentrically disposed at the lower tube 200 such that the lower tube 200 has enough space to form the axial groove 210, which is favorable for the space arrangement of the lower tube 200. Please be noted that, in the present disclosure, a centroid is calculated by the wall surrounding the space (please ignore the convex or concave portions) or by the wall of the tube body (please ignore the convex or concave portions), and the axis passing the centroid is defined as the central axis. Although the lower tube 200 and the inserted space 220 are both circular-column shaped, in other embodiments, the shapes of the lower tube and the inserted space can be varied, the inserted space can be concentrically disposed at the lower tube, and the present disclosure is not limited thereto.

Figure 4:
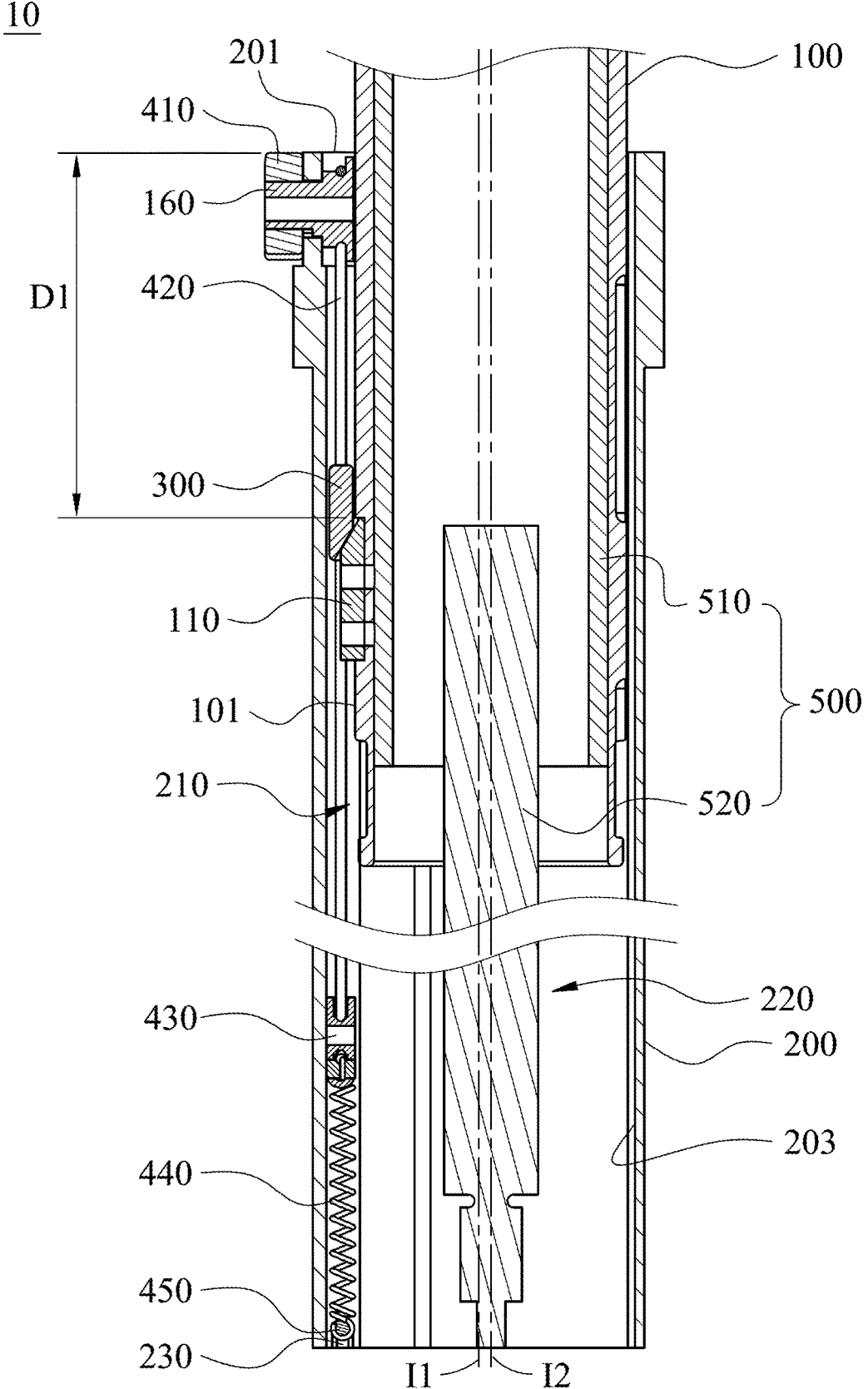
FIG. 4 shows another cross-sectional view of the bicycle seat post structure according to the embodiment of FIG. 1.

FIG. 4 shows another cross-sectional view of the bicycle seat post structure 10 according to the embodiment of FIG. 1. Please refer to FIG. 4 with reference to FIGS. 2 and 3. The position of the sliding member 300 in FIG. 3 is different from the position of the sliding member 300 in FIG. 4. To be more specific, the knob 410 is rotated to allow the left portion of the wire 420 in FIG. 2 to move downwardly and to allow the right portion of the wire 420 in FIG. 2 to move upwardly, and the sliding member 300 will be moved downwardly to switch from the position shown in FIG. 3 to the position shown in FIG. 4. The stopping member 110 is in the second position in FIGS. 3 and 4, and because the position of the sliding member 300 is changed, the distance D1 in FIG. 4 is larger than the distance D1 in FIG. 3. In other words, the restoring stroke of the upper tube 100 in FIG. 4 is smaller than the restoring stroke of the upper tube 100 in FIG. 3. Hence, after the actuating bar 520 of the height adjusting mechanism 500 is operated, if no human factor is presented, the final height of the upper tube 100 in FIG. 4 will be lower than the final height of the upper tube 100 in FIG. 3. As a result, the user can set the height of the sliding member 300 according to his/her habits, and the upper tube 100 can be restored to the predetermined position which is substantially equal to the position of the sliding member 300, and the using convenience is increased.

Figure 5:
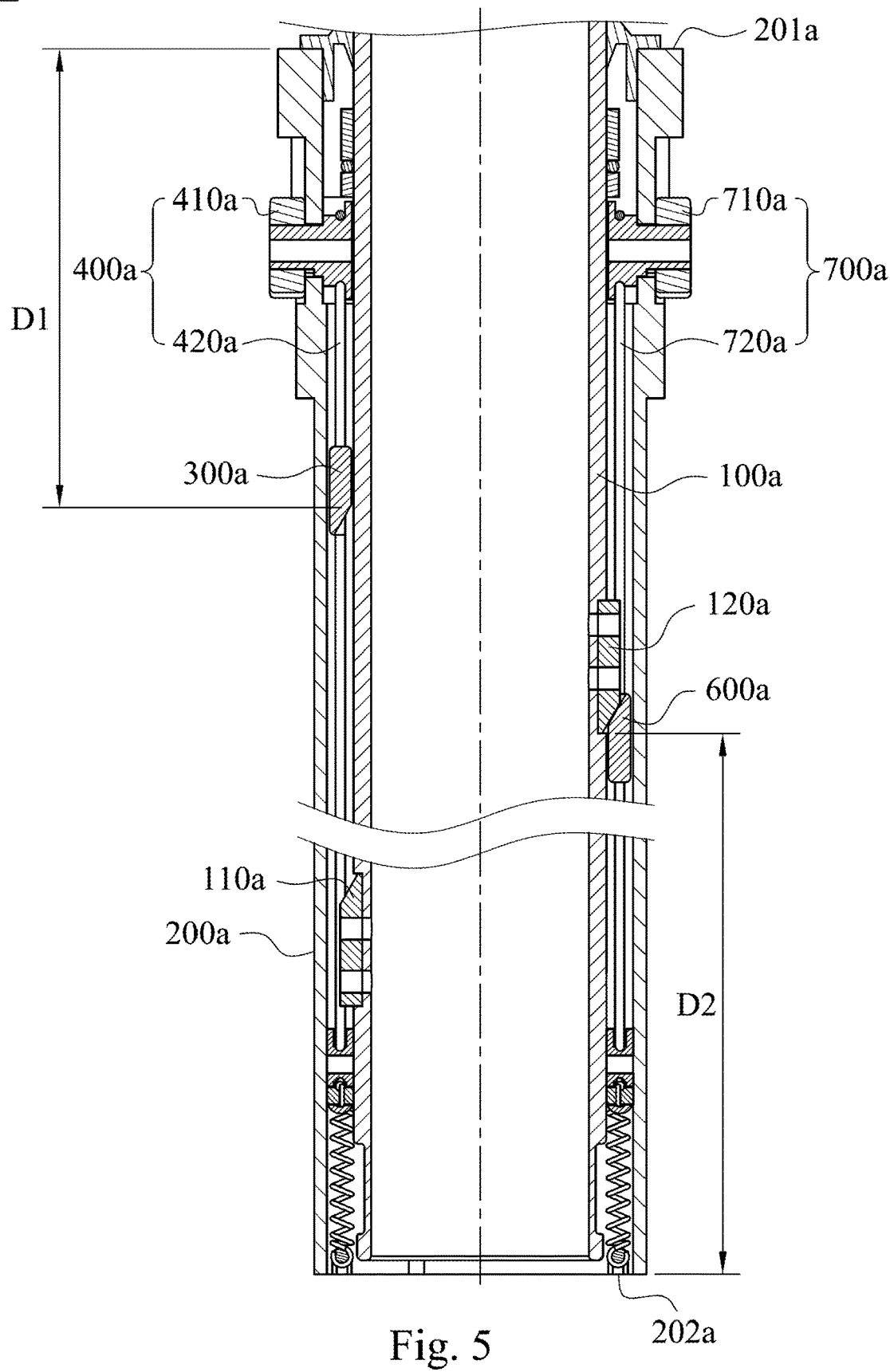
FIG. 5 shows a cross-sectional view of a bicycle seat post structure according to another embodiment of the present disclosure.

FIG. 5 shows a cross-sectional view of a bicycle seat post structure 20 according to another embodiment of the present disclosure. The bicycle seat post structure 20 is similar to the bicycle seat post structure 10 of FIGS. 1-4. The difference is that the inserted space (not shown) and the lower tube 200a are concentric, a number of the stopping members 110a and 120a is two, and a number of the sliding members 300a and 600a is two. The two stopping members 110a and 120a are symmetrically disposed at the outer wall (not labeled). After the sliding member 300a is operated to move along the axial direction so as to be positioned from one position to another position, the distance D1 between the stopping member 110a in the second position and the first edge 201a is changed. After the sliding member 600a is operated to move along the axial direction so as to be positioned from one position to another position, the distance D2 between the stopping member 120a in the second position and a second edge 202a of the lower tube 200a is changed. Please be noted that, the stopping member 110a in the second position is abutted against the sliding member 300a, and the distance D1 is substantially equal to the distance between the sliding member 300a and the first edge 201a; similarly, the stopping member 120a in the second position is abutted against the sliding member 600a, that is the position shown in FIG. 5, and the distance D2 is substantially equal to the distance between the sliding member 600a and the second edge 202a.

Moreover, a number of the driving mechanisms 400a and 700a can be two, the structure of each of the driving mechanisms 400a and 700a is identical to the driving mechanism 400 in FIG. 2, and the details will not be mentioned. A number of the axial grooves (not labeled) can be two, each of the axial grooves is configured for receiving each of the driving mechanisms 400a and 700a, and each of the two sliding members 300a and 600a are disposed therein.

Therefore, a rotation of the knob 410a can cause the movement of the wire 420a to control the movement of the sliding member 300a, and a rotation of the knob 710a can cause the movement of the wire 720a to control the movement of the sliding member 600a, thereby controlling the stroke of the upper tube 100a, which can control the highest point and the lowest point of the upper tube 100a.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A bicycle seat post structure, comprising:
   an upper tube, comprising:
   an outer wall; and
   at least one stopping member protruding from the outer wall;
   a lower tube configured for the upper tube to be movably disposed therein and having a first edge;
   a height adjusting mechanism disposed in the upper tube and the lower tube; and
   at least one sliding member movably disposed in the lower tube;
   wherein the at least one stopping member does not abut against the at least one sliding member as the at least one stopping member is in a first position, when the height adjusting mechanism is operated to allow the upper tube to move along an axial direction, the at least one stopping member is switched to a second position and is restricted by the at least one sliding member, the at least one sliding member is operated to move along the axial direction so as to be positioned from one of a plurality of positions to another one of the plurality of positions, thereby changing a distance between the at least one stopping member in the second position and the first edge.

2. The bicycle seat post structure of claim 1, further comprising at least one driving mechanism, the at least one driving mechanism comprising:
   a spool pivotally disposed at the lower tube;
   a wire supported by the spool and connected to the at least one sliding member; and
   a knob coupling to the spool;
   wherein a rotation of the knob causes a movement of the wire, thereby leading the at least one sliding member to move along the axial direction.

3. The bicycle seat post structure of claim 2, wherein the at least one driving mechanism further comprises:
   a pulley spaced apart from the spool; and
   a spring, wherein one of two ends of the spring is restricted by the lower tube and the other one of the two ends of the spring is connected to the pulley;
   wherein the wire supported by the spool and the pulley forms a ring shape.

4. The bicycle seat post structure of claim 1, wherein the lower tube comprises:
   an inner wall; and
   at least one axial groove disposed at the inner wall configured for the at least one sliding member to be received therein;
   wherein the at least one sliding member is moved along the axial groove.

5. The bicycle seat post structure of claim 1, wherein a number of the at least one stopping member is two, a number of the at least one sliding member is two, the two stopping members are symmetrically disposed at the outer wall, one of the two sliding members is operated to move along the axial direction so as to be positioned from one of the plurality of positions to another one of the plurality of positions, thereby changing the distance between one of the two stopping members in the second position and the first edge, and the other one of the two sliding members is operated to move along the axial direction so as to be positioned from one of the plurality of positions to another one of the plurality of positions, thereby changing a distance between the other one of the two stopping members in the second position and a second edge of the lower tube.

6. A bicycle seat post structure, comprising:
   an upper tube, comprising:
   an outer wall; and
   at least one stopping member protruding from the outer wall;

a lower tube configured for the upper tube to be movably disposed therein and having a first edge; and at least one sliding member movably disposed in the lower tube;

wherein the at least one stopping member does not abut against the at least one sliding member as the at least one stopping member is in a first position, when the upper tube moves along an axial direction, the at least one stopping member is switched to a second position and is restricted by the at least one sliding member, the at least one sliding member is operated to move along the axial direction so as to be positioned from one of a plurality of positions to another one of the plurality of positions, thereby changing a distance between the at least one stopping member in the second position and the first edge.

7. The bicycle seat post structure of claim 6, further comprising at least one driving mechanism, the at least one driving mechanism comprising:

a spool pivotally disposed at the lower tube;

a wire supported by the spool and connected to the at least one sliding member; and a knob coupling to the spool;

wherein a rotation of the knob causes a movement of the wire, thereby leading the at least one sliding member to move along the axial direction.

8. The bicycle seat post structure of claim 7, wherein the at least one driving mechanism further comprises:

a pulley spaced apart from the spool; and a spring, wherein one of two ends of the spring is restricted by the lower tube and the other one of the two ends of the spring is connected to the pulley;

wherein the wire supported by the spool and the pulley forms a ring shape.

9. The bicycle seat post structure of claim 6, wherein the lower tube comprises:

an inner wall; and at least one axial groove disposed at the inner wall for the at least one sliding member to be received therein;

wherein the at least one sliding member is moved along the axial groove.

10. The bicycle seat post structure of claim 9, wherein the lower tube comprises:

an inserted space configured for the upper tube to be disposed therein and communicated with the axial groove;

wherein a central axis of the inserted space and a central axis of the lower tube are not coaxial.

* * * * *